(12) United States Patent
Thomas

(10) Patent No.: US 6,614,466 B2
(45) Date of Patent: Sep. 2, 2003

(54) TELESCOPIC RECONSTRUCTION OF FACIAL FEATURES FROM A SPEECH PATTERN

(75) Inventor: David R. Thomas, Opio (FR)

(73) Assignee: Texas Instruments Incorporated, Dallas, TX (US)

( * ) Notice: Subject to any disclaimer, the term of this patent is extended or adjusted under 35 U.S.C. 154(b) by 190 days.

(21) Appl. No.: 09/791,110

(22) Filed: Feb. 22, 2001

(65) Prior Publication Data

US 2002/0154212 A1 Oct. 24, 2002

(51) Int. Cl.$^7$ .................................................. H04N 7/14
(52) U.S. Cl. ................................ 348/14.13; 348/14.01; 704/235
(58) Field of Search ............................. 348/14.01–14.05, 348/14.07–14.16, 515; 704/235, 258, 259, 261, 270; 706/2

(56) References Cited

U.S. PATENT DOCUMENTS

| | | | | |
|---|---|---|---|---|
| 5,426,460 A | * | 6/1995 | Erving et al. ............ | 348/14.02 |
| 5,557,661 A | * | 9/1996 | Yokoyama ............... | 348/14.15 |
| 5,608,839 A | * | 3/1997 | Chen ........................... | 704/235 |
| 5,621,858 A | | 4/1997 | Stork et al. ................ | 395/2.41 |
| 5,842,194 A | * | 11/1998 | Arbuckle ....................... | 706/2 |
| 5,907,351 A | | 5/1999 | Chen et al. .................. | 348/14 |
| 6,366,885 B1 | * | 4/2002 | Basu et al. ................. | 704/235 |

FOREIGN PATENT DOCUMENTS

| | | |
|---|---|---|
| EP | 0 673 170 A | 9/1995 |
| EP | 0 755 046 A | 1/1997 |
| EP | 0 893 923 A1 | 1/1999 |

OTHER PUBLICATIONS

Tao, et al.: "Compression of MPEG–4 Facial Animation Parameters For Transmission of Talking Heads" IEEE Transactions On Circuits And Systems For Video Technology, US, IEEE Inc. New York, vol. 9, No. 2, Mar. 1999, pp. 264–276.

Chen, et al.: "Lip Synchronization in Talking Head Video Utilizing Speech Information" Proceedings Of TheSPIE, US, SPIE, Bellingham, VA, vol. 2501, No. 3, 24–26, May 1995, pp. 1690–1701.

* cited by examiner

*Primary Examiner*—Wing Chan
(74) *Attorney, Agent, or Firm*—Bret J. Petersen; W. James Brady, III; Frederick J. Telecky, Jr.

(57) ABSTRACT

To reduce the needed bandwidth of video communication system, a portion of the video image that differs from a preceding frame of the video image is predicted from the decompressed audio data with a model operating at both the transmitter and the receiver. The model accuracy is increased and the synchronisation enhanced by reducing the number of degrees of freedom of the model and by making the prediction of the next phoneme in a hierarchical manner.

4 Claims, 4 Drawing Sheets

TELESCOPIC RECONSTRUCTION OF FACIAL FEATURES FROM A SPEECH PATTERN

FIELD OF THE INVENTION

The present invention relates generally to the compression of data in a signal having a video component and an audio component, and more particularly to a method and apparatus for reducing the data transmission requirements of signals transmitted between remote terminals of a video communication system.

BACKGROUND TO THE INVENTION

Currently available video communication systems generate poor quality video images providing small display areas, jerky motion, blurring, blocky looking artefacts and in many instances the audio fails to fully synchronise with the video images. This is largely due to group delay introduced by the compression/decompression of the video signal for transmission.

The fundamental objective of recent developments in video communication systems has been to provide the best quality video image within the available data rate. Typically, video data is compressed prior to transmission and decompressed prior to generating an image following transmission.

Since the bandwidth is dictated by the available transmission medium, video communication systems requiring higher data rates generally require greater compression of the video image. Conventional compression rates for video compression systems are in the range of 100-to-1 to 300-to-1. However, high compression of the video image will invariably result in a loss in the quality of the video image, particularly in sequences with significant changes from frame-to-frame. Disadvantageously an increase in compression requires an increase in computational capability or an increase in group delay.

Recent developments in video communication systems have attempted to alleviate some of the problems described by reducing the level of data required by the receiver for generating the display video image. This has been achieved by selecting and compressing video data only from those regions of the video image containing significant changes from frame-to-frame for transmission to the receiver. However, the quality of the display video image remains compromised where the monitored event comprises a situation where high levels of motion in separate regions of the video image occur, for example in a video conference situation where the monitored event comprises a group of users.

In video conferencing situations users derive a greater comfort factor from systems that are able to generate a display image in which the video component and the audio component are synchronised. Furthermore, it has been found that users are better able to comprehend audio data (speech) where the facial movements of other users are distinct. Therefore, it is desirable to maintain and even enhance the resolution of the display video image in regions comprising the facial features of the user.

A previous patent application, EP 95301496.6 Video signal processing systems and methods utilising automated speech analysis, describes a method of increasing the frame rate of a video communication system by monitoring the utterances of the speaker and reconstructing non-transmitted frames between transmitted frames from stored facial feature information. The described system uses a fixed transmitted frame rate with reconstructed frames between to increase the effective frame rate at the receiver. The group delay problem of the prior art is not addressed by this application. This system is also prone to errors in the decoder due to error propagation and has no defined start-up method.

A video communication system and method for operating a video communication system that reduces the levels of data required by the receiver for generating the display video image has been described previously in application number EP 97401772.5. This application described transmitting only video data for regions of successive frames that contain "substantial" differences frame-to-frame, while video data corresponding to the facial region of the "active" user at any instant is predicted from the received audio data. It was shown to transmit the audio data (speech) to the receiver without the corresponding video data that corresponds to facial features. The received audio data was then used to predict pixels of the display video image that have changed from a preceding frame, in order that the current frame of the display video image can be reconstructed; resulting in a reduction in the data rate requirements of the video communication system and a reduction in group delay. This method invention is describe further herein in conjunction with the present invention.

SUMMARY OF THE INVENTION

A model of the facial features associated with the speech patterns of the speaker is created to generate video at the receiver for portions of the video image that change rapidly. When the model is operating within given error boundaries, it will only be necessary to transmit the audio portion of the data. Since the accuracy of this model versus the initial video stream of the speaker affects the bandwidth required to send the video stream, it is desirable to improve the accuracy of the model to minimise the required bandwidth. The present invention is concerned with this model accuracy and reducing the time taken to synchronise the model by reducing the number of degrees of freedom of the model and by making the decision in a hierarchical manner.

The method and system disclosed by the present teachings utilise a sub-phoneme decision making process to improve the accuracy of the facial model produced by limiting the number of options from which the model produced in a subsequent instant can be formed. Using this method and system the group delay of the system can be reduced to approximately the group delay for speech (i.e. <20 msec) plus the sampling period used to define a subphoneme (e.g. ~50 msec). Additionally, the speech and video are reproduced without significant echo as the speech and sound are substantially synchronised.

BRIEF DESCRIPTION OF THE DRAWINGS

The present invention will now be further described, by way of example, with reference to certain preferred and exemplary embodiments of the invention that are illustrated in the accompanying drawings in which:

FIG. 3a is a flow diagram illustrating a method of operating the transmitting portion of FIG. 1a.

For convenience like and corresponding features of the drawings will be referenced by like and corresponding reference numerals where possible.

DETAILED DESCRIPTION OF THE PREFERRED EMBODIMENTS

Figure 1A:
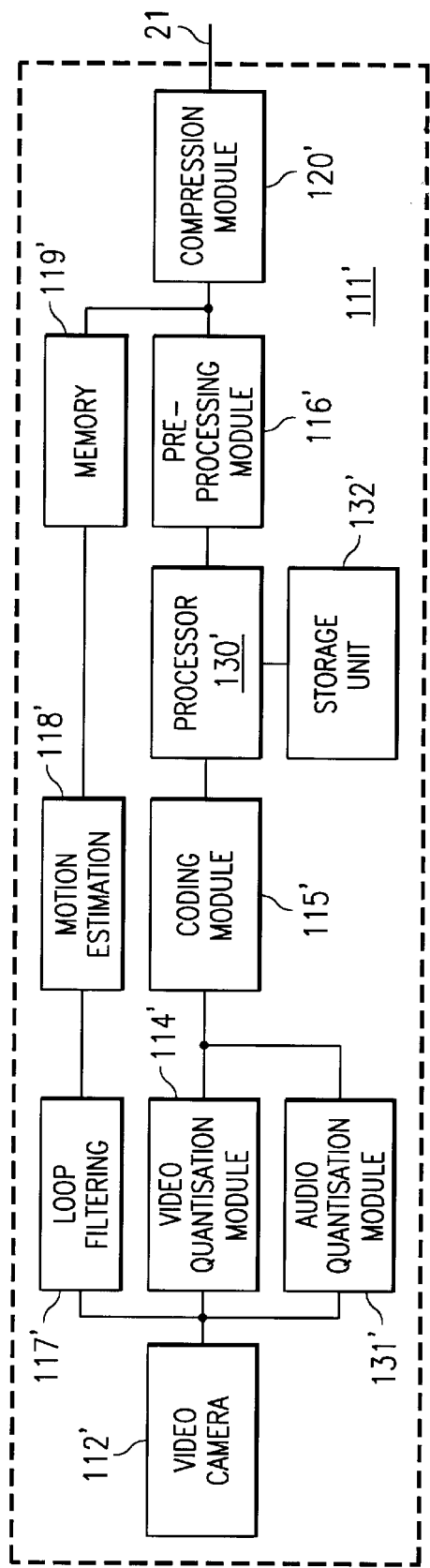
FIG. 1a is a schematic block diagram of a transmission portion of a video communication system in a prior art system.
Figure 1B:
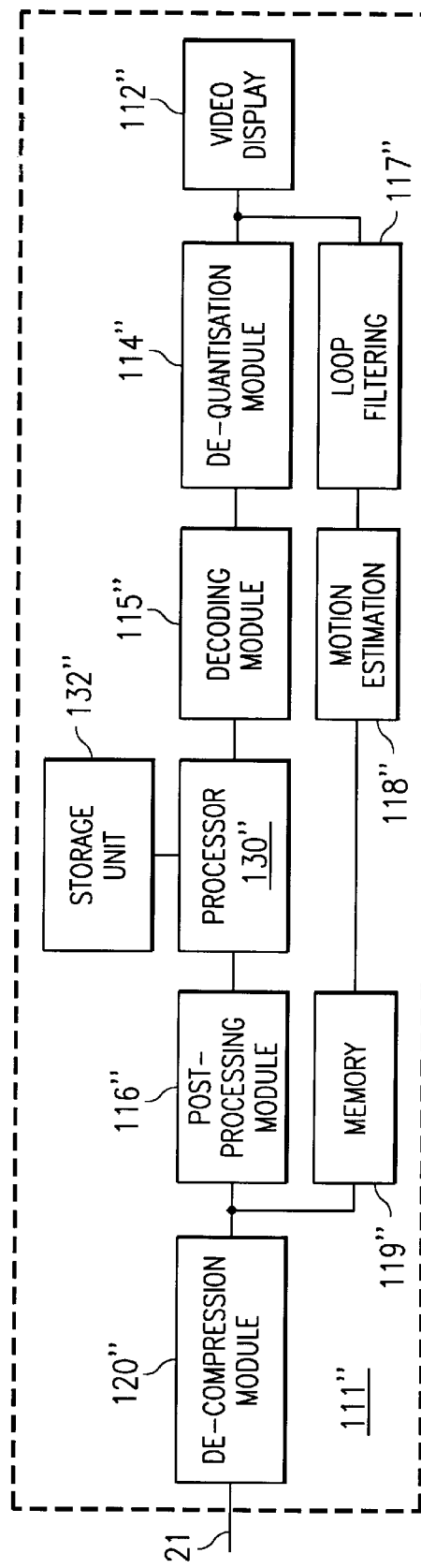
FIG. 1b is a schematic block diagram of a receiving portion of a video communication system in a prior art system.

FIGS. 1a and 1b show a schematic block illustration of a prior art high-specification video communication system 10. For convenience, the video communication system 10 will be described in terms of a transmitting portion 111' in FIG. 1a and a receiving portion 111" shown in FIG. 1b. However, it will be understood by the skilled person that generally operation of the video communication will require both the portion 111' and the portion 111" to be capable of both generating and transmitting video data, and receiving and converting the video data to generate a video image.

The transmitting portion 111' includes a video camera 112', quantisation module 114', coding module 115', processor 130', storage unit 132', pre-processing module 116', loop filtering circuit 117', motion estimation module 118', memory 119', and compression module 120'. Similarly, the receiving portion comprises a video display 112", quantisation module 114", coding module 115", processor 130", storage unit 132", post-processing module 116", loop filtering circuit 117", motion estimation module 118", memory 119", and decompression module 120". It should be understood that various components described may perform dual functions dependant upon the portion 111' or the portion 111" operating in a transmitting or receiving mode of operation. It will further be understood that the transmitting portion 111' and the receiving portion 111" are connected by a transmission medium 121, which may comprise a "hard-wired" electrical connection, a fibre optic connection, or a radio frequency connection.

Figure 2:
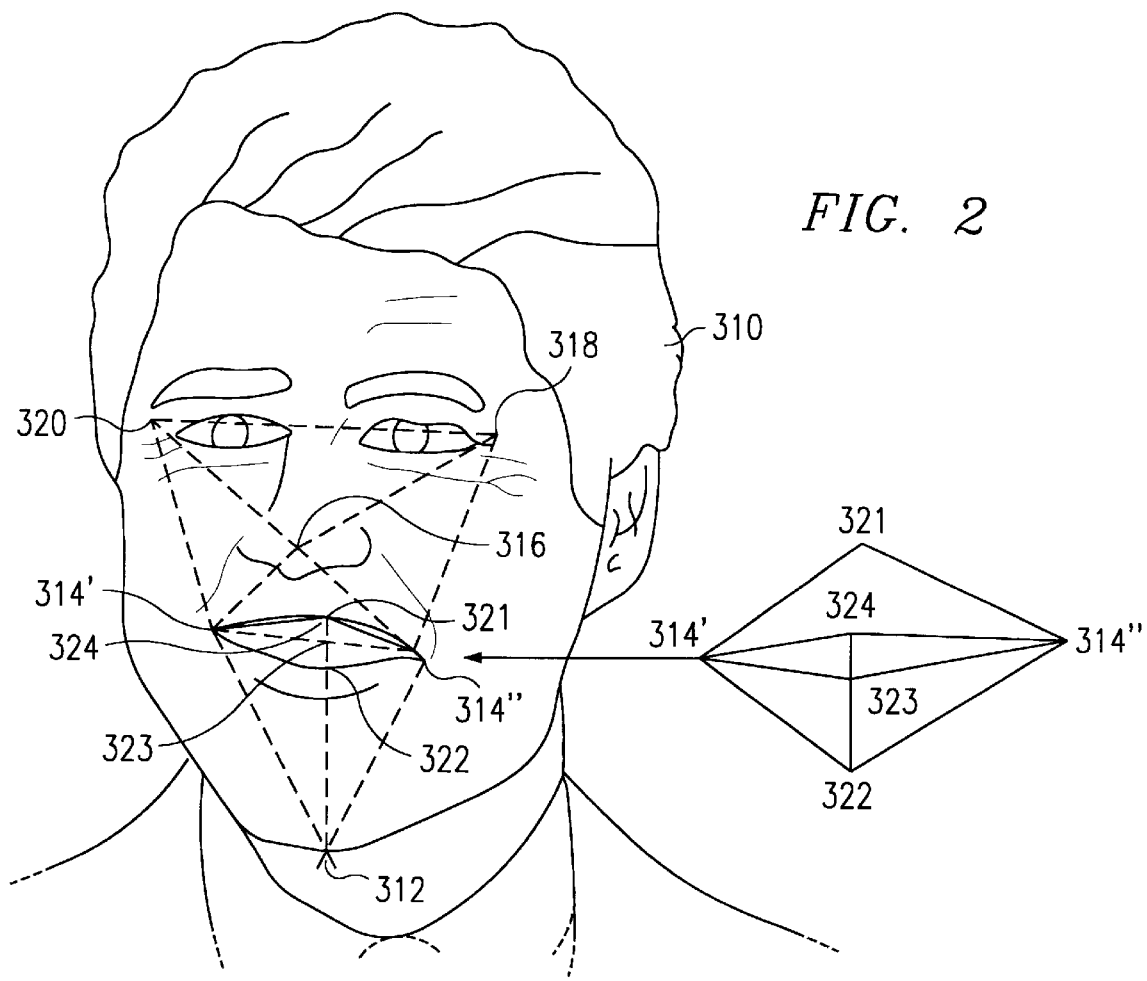
FIG. 2 is an example display video image from a video conferencing situation.

Referring now to FIG. 2, an example display video image from a video conferencing situation is illustrated. The display video image comprises the head and shoulder region of a user monitored by the video camera 112'. The processor selects integers corresponding to predetermined facial features (marked by crosses). For example, the selected integers in FIG. 2 are the chin 312, opposing edges of the mouth 314' and 314" respectively, the nose 316, and the outer edge of each eye 318 and 320 respectively.

Preferably, the video image is divided into substantially triangular regions or blocks of pixels. Each of these regions is represented by an Eigen feature. In regions where motion is likely to be frequent (i.e. the background) but assist the user little in his comprehension of the audio data (speech), the regions comprise a larger area of pixels than regions from which the user gains much assistance in comprehension of the audio data (e.g. mouth, chin, eyes, nose). Therefore, Eigen features for video data corresponding to the region enclosed by the integers 312, 314, 316, 318, 320 are representative of a smaller area of pixels than Eigen features corresponding to an area of the video image that is external to the region enclosed by the integers.

Transmitting Portion

Operation of the transmitting portion 111' of FIG. 1a will now be described in detail with reference to FIG. 3a and FIG. 2. For convenience, the operation of the transmitting portion 111' will be discussed for a situation where the video camera 112' monitors the head and shoulder region of an active user.

Figure 3A:
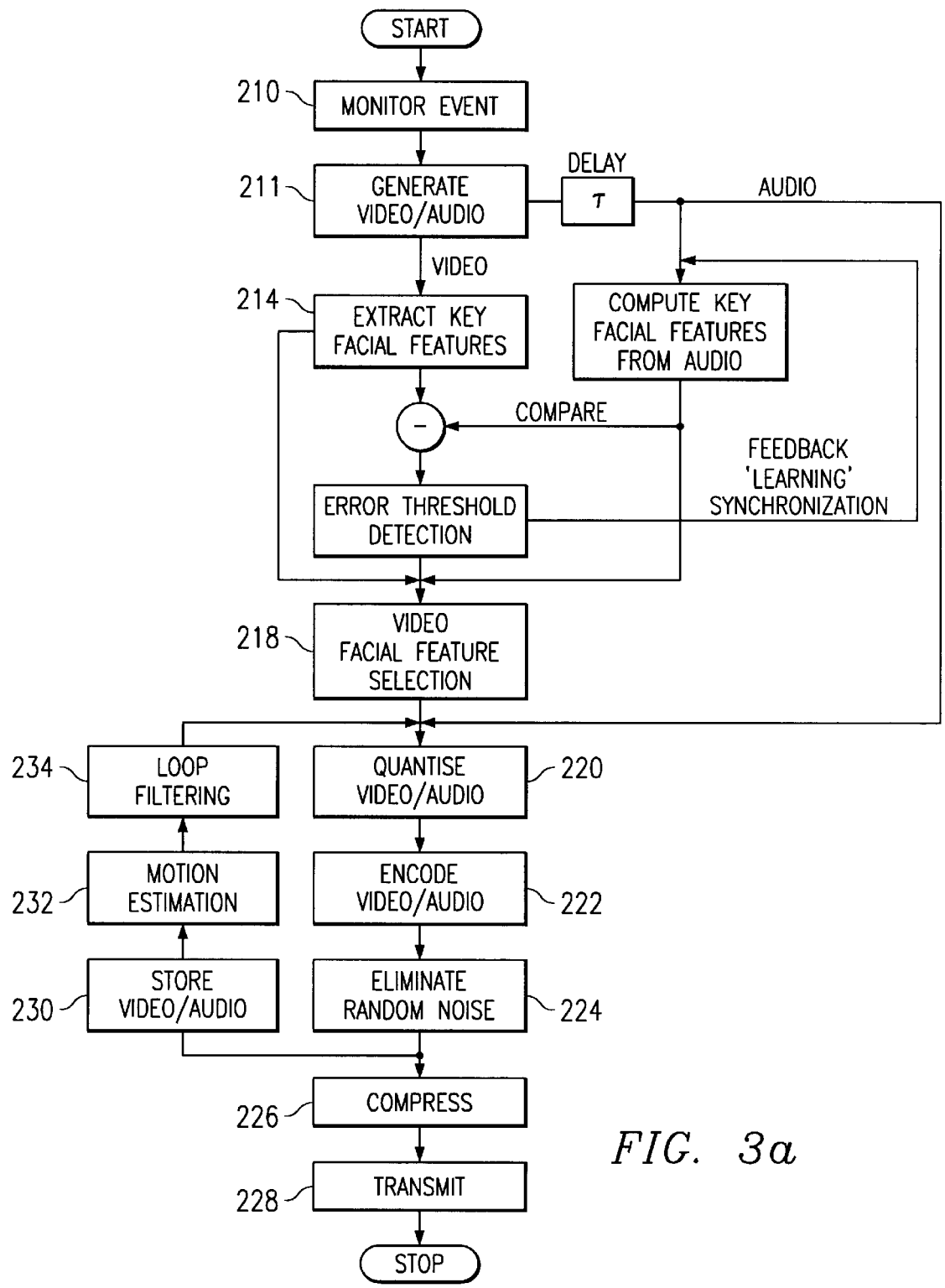

Referring firstly to FIG. 3a, the transmitting portion 111' of the video communication system 110 monitors an event with video camera 112' (Block 210). Typically, the monitored event will comprise a video conferencing situation where a first user or group of users is monitored by the camera 112'. As is well known in the art, the video camera 112' is arranged to monitor the active user (i.e. the currently speaking user).

Quantisation module 114' assigns each bit of the video data received from the video camera 112' to a predetermined quantisation level (Block 211). The processor 130' receives the quantified video data and identifies selected integers of the user facial features (Block 214). For example, it is commonly known that the facial features that provide users with the most assistance when comprehending speech are the regions around the eyes, nose, mouth and chin.

The processor 130' assigns each area of the video image to an Eigen feature. Typically, Eigen features that are representative of regions between the integers have a smaller area of pixels than regions not enclosed by the integers.

It will be appreciated by the skilled person that it is advantageous to assign Eigen features representative of a smaller area of pixels to those regions of the video image in which significant motion is probable, and to assign Eigen features representative of a greater area of pixels to those regions of the video image in which motion and/or the relevance of the information content of the video data are less. The use of an appropriate digital signal processor, such as the TMS320C6X manufactured by Texas Instruments Inc., will provide a system that is reactive to the information content of the video data at any instant.

The processor 130' then compares each Eigen feature of the current frame of the video image with each corresponding Eigen feature of a preceding frame of the video image that is stored in storage unit 132'. If the processor 130' determines that the differences between an Eigen feature of the frame of the current video image and a corresponding Eigen feature of the preceding image are greater than a predetermined value, the processor 130' selects only video data corresponding to each Eigen feature that exceeds the predetermined value (Block 218).

The coding module 115' receives the video data from the processor 130' and encodes each Eigen feature in a frame of the video image (Block 222).

The pre-processing module 116' receives the encoded video data from the coding module 15' and eliminates the randomly generated noise that may cause single pixel errors originating from the video camera 12' (Block 224).

Compression module 120' receives the encoded and pre-processed video data and performs a compression process on the video data (Block 226). The compressed video data is then transmitted via the transmission medium 121 to the receiving module 111" (Block 228), but is also stored in memory 119' (Block 230) to assist with reducing the data content of subsequently transmitted frames of the video image.

In typical operational situations, the background and various features monitored by the video camera 112' remain substantially stationary from one frame period of the video image to the next frame period. The encoded video data stored in memory 119' is used by motion estimation module 118" to generate motion vectors that estimate the position of the each Eigen feature according to the position of that Eigen feature in a preceding frame (Block 232). Since motion between subsequent frame periods may be relatively complex (e.g. a rotating hand), motion vectors are only capable of providing rough approximations of the position of an Eigen feature. Although additional data can be provided to improve the approximation of the position of the Eigen feature(s), the provision of more accurate approximations of the position of the Eigen feature(s) requires the transmission of less correcting data.

Following the generation of motion vectors by motion estimation module 118', a further improvement in the quality of the video image is obtained by reducing large errors in the prediction data and estimation vectors. This is achieved by loop filtering module 117' that performs a loop filtering process using "intraframe" coding techniques (Block 234).

During an initial period of operation, video data corresponding to each Eigen feature of the display video image is selected (Block 218), quantised (Block 220), encoded (Block 222), filtered to eliminate random noise (Block 224), compressed (Block 226), and transmitted to receiving portion 111" (Block 228). Similarly, the transmitting portion 111' operates in accordance with the initial period of operation for a new video image, as may occur where a new user becomes the active user. Operation of the transmitting portion 111' of the video communication system during this period substantially corresponds with the operation of the transmitting portion 11' of the prior art video communication system of FIG. 1a.

During subsequent periods of operation, the processor 130' identifies regions between the selected integers (312, 314, 316, 318, 320) and determines whether the Eigen features between the identified integers have changed from a preceding frame of the monitored display video image. A change in the Eigen features between the identified integers is indicative of the following; (i) the monitored user is speaking; (ii) the frame of the video image of the monitored active user differs from the preceding frame (i.e. motion of the active user); (iii) the monitored event has changed.

(i) Speech, No Motion

Processor 130' identifies Eigen features of the display video image that substantially correspond with regions of the preceding display video image. For example, the head and shoulders of the monitored user may remain stationary for a sequence of frames although there will be motion of the regions around the eyes, nose and mouth as the monitored active user speaks.

Therefore, processor 130' selects video data for only those regions between selected integers where the Eigen features have changed from the preceding display video image. For example, when expressing the syllable "Ahh" the mouth is opened wide and consequently the chin drops, but eyes and nose remain substantially stationary.

Consequently, the number of Eigen features between the chin (312) and each edge of the mouth (314',314"), and the nose (316), and between each edge of the mouth (314',314") and nose (316) will increase. Thus movement of the facial features of the active user are detected by the processor 130' (Block 216). Since the display video image generally corresponds with the preceding display video image where the user's mouth is closed, except in those regions between the mouth, nose and chin Eigen features are only selected from those regions between these integers (312, 314, 316). Additionally, the changes in the number of Eigen features between these integers (312, 314, 316) are predictable from audio data. Therefore, only monitored audio data (speech) is quantised (Block 220), encoded (Block 222), filtered (Block 224), compressed (Block 226) and transmitted (Block 228) to receiving portion 111".

(ii) Speech and Motion

Processor 130' identifies regions of the display video image that substantially correspond with regions of the preceding display video image. For example, the shoulders of the monitored user may remain stationary for a sequence of frames, but the user may change the orientation of his head and there may motion of the regions around the eyes, nose and mouth as the monitored active user speaks.

Processor 130' selects those regions of the monitored video image where motion greater than a predetermined level is detected. This may be achieved by means of additional integer reference points selected by the processor 130', where a change in the number of Eigen features between adjacent integers is indicative of motion. For example, if the active user changed the orientation of his/her head by looking to his right, the distance between the integers 320 and 318, and between 314' and 314" would decrease on the display video image. Consequently, the number of Eigen features necessary to represent the intermediate region between these facial features would decrease.

Processor 130' selects video data for only those regions between selected integers where the number of Eigen features is different from the preceding display video image as described in reference to (i).

Movement of the facial features of the active user is detected by the processor 130' (Block 216). As the display video image is different from the preceding display video image where the user's mouth is closed and the user is looking directly into the video camera 112', video data is selected from the regions corresponding to the user's head and between the integers (312, 314, 316). Since the background will generally correspond with the preceding display video image, video data from these regions are ignored.

Since the changes in the number of Eigen features between the integers (312, 314, 316) is predictable from audio data, only video data corresponding to the user's head and monitored audio data (speech) is quantised (Block 220), encoded (Block 222), filtered (Block 224), compressed (Block 226) and transmitted (Block 228) to receiving portion 111".

However, in general use the head and shoulders of the monitored user may remain stationary for a sequence of frames while the user emphasises his/her speech by hand motions. Therefore, all video data except that corresponding to the hand of the user may be excised for transmission.

(iii) Monitored Event Changed

Operation of the transmitting portion where a change in the monitored event occurs, as for example a change of active user, will substantially correspond to the initial period of operation. Video data corresponding to each Eigen feature of the display video image is selected (Block 218), quantised (Block 220), encoded (Block 222), filtered to eliminate random noise (Block 224), compressed (Block 226), and transmitted to receiving portion 111" (Block 228).

Receiving Portion

Operation of the receiving portion 111" of FIG. 1b will now be described in detail with reference to FIG. 3b and FIG. 2.

Figure 3B:
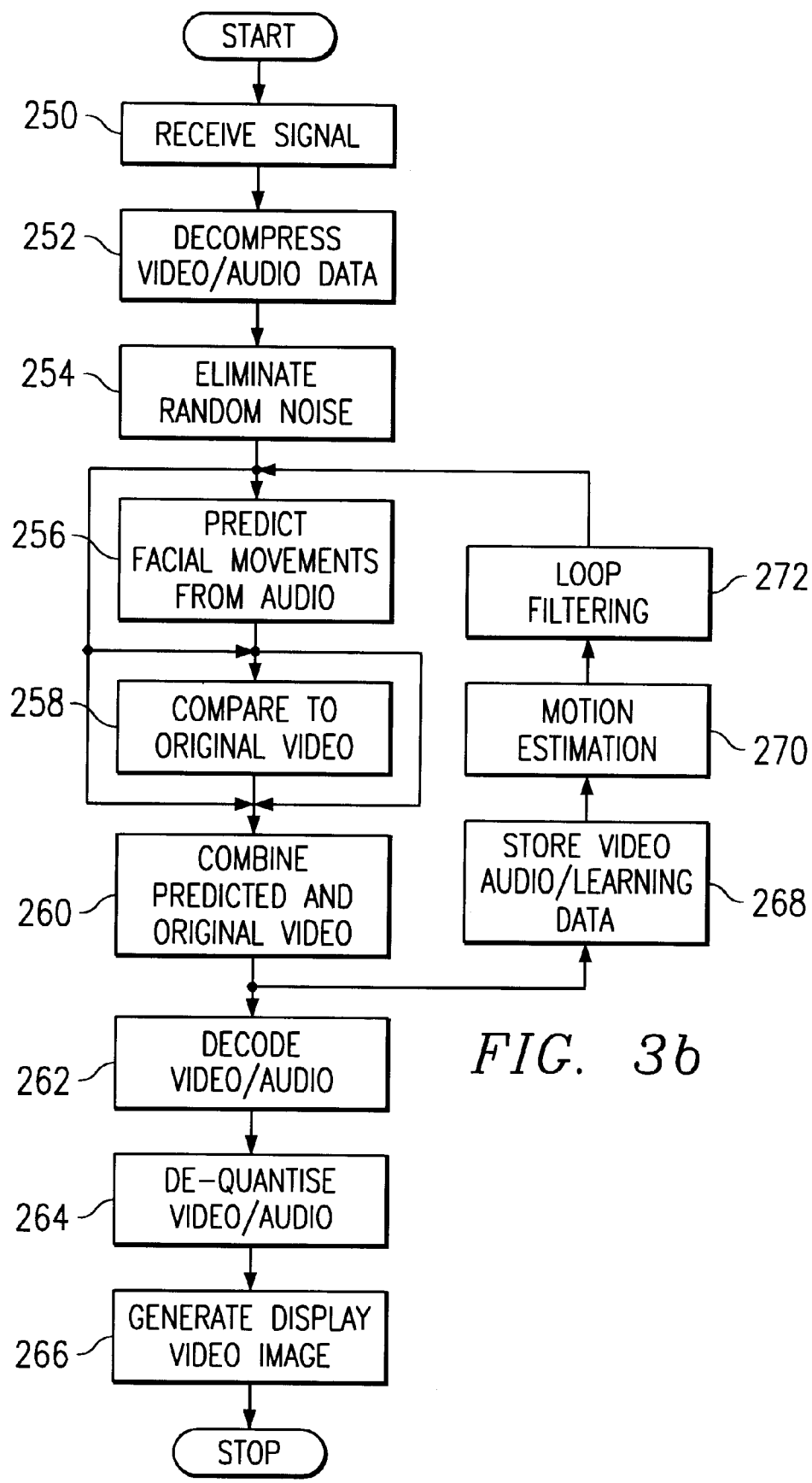
FIG. 3b is a flow diagram illustrating a method of operating the receiving portion of FIG. 1b.

Referring firstly to FIG. 3b, the receiving portion 111" receives a video signal from the transmitting portion 111' corresponding to an event monitored with video camera 112' (Block 250).

Decompression module 120" decompresses video and audio data from the received video signal (Block 252). The video and audio data is then filtered to remove noise introduced by the compression of the data at post-processing module 116" (Block 254).

The filtered video and audio data is received by the processor 130". The processor 130" selects Eigen features representative of those regions of the video image that were transmitted by the transmitting portion 111'. The processor 130" compares each element of the received audio data with a look-up table stored in storage unit 132". If an element of the received audio data substantially corresponds with an element representative of an Eigen feature or group of Eigen features of video data stored in the storage unit 132", the processor 130" predicts the location and value of the Eigen features for the remaining region or regions of the video image (Block 256). From the prediction of the location and value of the Eigen features for the remaining regions of the video image, the processor generates (Block 258) a second portion of the video data (first portion corresponds to video data received from transmitting portion). The received video data is combined (Block 260) with the reconstructed video data derived from the received audio data at combining module 134".

Following the combination of the received and reconstructed portions of the video data, the video data is passed via coding module 15" (Block 262) and quantisation module 14" (Block 264) to video display 12" for generation of the video image (Block 266).

Video data from the combined first and second portions of the video image may be stored in storage unit 132" prior to quantisation (Block 268). The stored video data may be used for comparing Eigen features of a current frame of the video image with Eigen feature of a preceding frame of the video image or may be used for refreshing Eigen features of the current frame of the video image if required.

It is preferred that motion estimation and loop filtering be performed by the transmitting module 111' in order that unnecessary bits of data do not utilise bandwidth that may be more effectively utilised by bits of data that change from frame-to-frame. However, motion estimation can also be performed at the receiving portion 111".

Each of the previously described factors, and additional factors not detailed herein but recognisable to the skilled person, contribute to the quality of the video image perceived by the user of the video communication system. However, it should be understood that although the present invention is described in terms of a video communication system complying with the ITU H.320 standard, the present invention is not limited to systems of the H.320 standard or to factors not specifically detailed herein.

During an initial period of operation, video data corresponding to each Eigen feature of the display video image is received from the transmitting portion 111' (Block 250). The receiving portion 111" operates in accordance with the initial period of operation for a new video image, as may occur where a new user becomes the active user. Operation of the receiving portion 111" of the video communication system during this period substantially corresponds with the operation of the receiving portion 11" of the prior art video communication system of FIG. 1b.

During subsequent periods of operation, the processor 130" identifies regions between the selected integers (312, 314, 316, 318, 320) and determines whether the number of Eigen features between the identified integers has changed from a preceding frame of the received display video image.
(i) Speech, No Motion Processor 130" receives audio data and identifies those regions of the display video image that substantially correspond with regions of the preceding display video image. For example, the head and shoulders of the monitored user may remain stationary for a sequence of frames although there will be motion of the regions around the eyes, nose and mouth as the monitored active user speaks.

Processor 130" reconstructs the display video image from Eigen features selected from the storage unit 134' in accordance with the received audio data. Therefore, the Eigen features selected are representative of only those regions between selected integers where the number of Eigen features is different from the preceding display video image. For example, when expressing the syllable "Ahh" the mouth is opened wide and consequently the chin drops, but eyes and nose remain substantially stationary.

Consequently, the number of Eigen features between the chin (312) and each edge of the mouth (314', 314"), and the nose (316), and between each edge of the mouth (314', 314") and nose (316) will increase. Therefore, the display video image generally corresponds with the preceding display video image where the user's mouth is closed, except in those regions between the mouth, nose and chin.
(ii) Speech and Motion Processor 130" receives video and audio data and identifies those regions of the display video image that substantially correspond with regions of the preceding display video image. For example, the shoulders of the monitored user may remain stationary for a sequence of frames, but the user may change the orientation of his head and there may motion of the regions around the eyes, nose and mouth as the monitored active user speaks.

Processor 130" reconstructs those regions of the display video image where motion greater than a predetermined level was detected by the transmitting portion 111'. For example, if the active user changed the orientation of his/her head by looking to his right, the distance between the integers 320 and 318, and between 314' and 314" would decrease on the display video image. Consequently, the number of Eigen features necessary to represent the intermediate region between these facial features would decrease.

Processor 130" receives video data for only those regions between selected integers where the number of Eigen features is different from the preceding display video image as described in reference to (i).

As the display video image is different from the preceding display video image where the user's mouth is closed and the user is looking directly into the video camera 112', video data is only received that corresponds to the regions corresponding to the user's head and between the integers (312, 314, 316). Since the background will generally correspond with the preceding display video image, video data from these regions is not received.

Since the changes in the number of Eigen features between the integers (312, 314, 316) is predictable from audio data, only video data corresponding to the user's head and monitored audio data (speech) is received (Block 220), from transmitting portion 111'.

However, in general use the head and shoulders of the monitored user may remain stationary for a sequence of frames while the user emphasises his/her speech by hand motions. Therefore, all video data except that corresponding to the hand of the user may be excised.
(iii) Monitored Event Changed Operation of the receiving portion 111" where a change in the monitored event has occurred, as for example a change of active user, will substantially correspond to the initial period of operation. Video data corresponding to each Eigen feature of the display video image is received from the transmitting portion 111' (Block 228).

The feedback learning synchronisation described above can be considered to operate as a model of the facial features associated with the speech patterns of the speaker. Since the accuracy of this model versus the initial video stream of the speaker affects the bandwidth required to send the video stream, it is desirable to improve the accuracy of the model to minimise the required bandwidth. The present invention is concerned with this model accuracy and reducing the time taken to synchronise the model by reducing the number of degrees of freedom of the model and by making the decision in a hierarchical manner.

Facial Feature Model

Using the system described above having a facial feature model, a system may be implemented which does not require transmission of video frames on a regular basis. Instead of synchronised video, frames can be sent when the model output is below a quality threshold. At such times when full frames need to be sent, the frame rate could be compromised to a lower rate, but when the model is accurate, the effective frame rate is increased. If the model is accurate for a period without movement of the speaker's head or other movement such that only audio data is sent, the actual frame rate could be zero frames per second for a given period.

The facial model includes an encoder at the transmitter and a decoder at the receiver. The face of the speaker is modelled at each end. Thus the encoder and decoder models run in parallel at both the receiver and the transmitter. A portion of the video stream is derived from the receiver model and inserted into the video stream at the receiver. The receiver model may continue to create reconstructed frames despite a low accuracy of the reconstructed frames. The encoder model however can respond to the lower accuracy of the model by sending full frames of video or those portions of the frame that have movement at a reduced frame rate. The encoder model may be programmed to send full frame data when the probability of selecting the correct Eigen feature to reconstruct a facial feature at a pre-selected probability, or dynamically changing probability based on some other condition such as a user selected quality measure.

At the start of a videoconference, and at other times when needed, the facial model operates in a training mode. In the training mode, the parallel models each build a library of video Eigen features. The models are built from audio and video of the speaker where Eigen features and speech phonemes are dynamically correlated. The training mode may include a training sequence where the speaker is asked to speak a set phrase to capture the related facial features into memory. A database may also be stored for future reference for a specific speaker. In a more advance system, the training mode may be performed merely using the speaker's initial conversation to build the database. In this situation, a user independent set of facial Eigen features could be used and/or reduced frame rates during the training period.

Since the equivalent facial models are produced at both the transmitter and the receiver, the transmitter is always capable of predicting the facial model in use at the receiver in any given instant (and vice versa). Consequently, it is also possible for the transmitter to predict the performance of the facial model operating at the receiver in any given instant. Therefore, the transmitter may be capable of predicting when it is necessary to transmit full frames of the video image. The method and system disclosed by the present teachings may be considered to have some degree of intelligence.

The skilled person will readily appreciate that in a normal video conference environment the transmitter and receiver portions of the system disclosed herein are interchangeable, the mode of operation being dependent upon the active participant at any given instant (i.e. the speech associated movement in a video telephony system is uni-directional since only one person speaks at any given instant).

Consequently, when the system is operating in a mode in which Person A is speaking:

| Person A (speaking) | Person B (listening) |
|---|---|
| Tx model A active | Rx model A active |
| Rx model B inactive | Tx model B inactive |

Dependent upon the accuracy of the facial model of person A, certain selected facial features can be removed prior to compression and transmission. Since the facial model of person A is operated at both the transmitter and receiver, the facial model of A reproduced at the receiver has substantially the same degree of accuracy as the facial model of A produced at the transmitter. Consequently, the facial model of A reproduced at both the receiver and transmitter can be reconstituted to a defined degree of accuracy where a high degree of movement is encountered in the monitored environment. Generally, in this scenario the model of person B is not activated since there is no speech from B.

Where the active participant changes (i.e. Person A falls silent and Person B starts speaking) the system changes its mode of operation to:

| Person A (listening) | Person B (speaking) |
|---|---|
| Tx Model A inactive | Rx Model A inactive |
| Rx model B active | Tx model B active |

Since changes in the active participant are generally preceded by a pause in speech (e.g. a silent period of the order of several 100's of milli-seconds prior to speakers switching), the apparatus at the currently transmitting end has ample time to predict the change and switch from a transmitting mode of operation to a receiving mode of operation (and vice versa). Thus, the facial model of A produced at both the A & B end is switched to the facial model of B. Such an active switching arrangement requires little additional computing overhead.

An improvement of the model according to the present invention takes advantage of the fact that speech is a time continuous process in which the mouth formation is restricted by the historical formation. For example, when there is silence the mouth is either closed or in a relaxed stationary form. The speaker then would commence to open the mouth to provide the utterance of a phoneme. There is no instantaneous change in the shape of the mouth but a gradual opening. For the next phoneme the change in the shape of the mouth is dependent on the original phoneme since the facial muscles prevent an instantaneous change in the shape of the mouth. Therefore there are constraints on the model due to the speech patterns and the previous state of the model. These constraints can be used to simplify the model decision making process, improve the probability of choosing the correct eigen feature, and reduce the group delay in the system between the audio and video portions of the data stream.

In the present invention, the phonemes can be broken into smaller portions of speech call sub-phonemes. A subsequent sub-phoneme can be predicted from prior phonemes and sub-phonemes. The subsequent sub-phoneme is constrained by the overall phoneme it is contained within and by the previously uttered sub-phoneme such that there is a finite number of possibilities for all facial speech transitions. The facial model could also incorporate neural network architectures to select the most probable sub-phoneme from a subset of phonemes and the corresponding facial features In an embodiment of the present invention the model is predefined to start in a neutral position for example the mouth is slightly open. The speech is then sampled at a frequency that is higher than the minimum Nyquist frequency necessary for the reconstruction of the speech. The first part of the phoneme, or the first sub-phoneme, will then define that the person is transitioning from a silent period to active speech based on the characteristics of the first sample of the phoneme. The decision is made as to the next sub state of the facial model from one of a small number of possible options, e.g. the mouth opens a small amount if the sample corresponds to the start of a phoneme such as an "a", but a larger amount if the sample corresponds to a phoneme corresponding to an "O" or a negative amount if the phoneme corresponds to a "b".

The second sample is then used to improve the decision as to the exact phoneme that is being uttered and the facial model is altered by an amount towards the eigen feature that corresponds to that phoneme. Again, the number of possible options for the change in the facial model is limited. If the mouth starts to open at a particular rate then it is probable that it will continue to open at the same rate until it reaches the defined maximum dictated by the individual, then it will stop and then either change shape or start to close. The restriction on the number of options for evolution of the shape of the mouth dictates the speed at which one speaks and the make up of a specific language. For example, one is restricted in the speed at which one can say "AOB" by the rate of change of the mouth from slightly open to fully open to closed then to slightly open.

Another improvement of the present invention relates to reinsertion of the model facial features into the image. When there are small movements of the head, the location of the mouth will change where the model facial features need to be inserted. An area around the mouth can be selected such as a rectangular box. The facial model will then comprise a set of stored facial features that fit inside this box. In one embodiment, the position of the box in relation to the head is tracked by the facial model software at the transmitter and a reference transmitted with full images of where the mouth box is to be reinserted. Similarly, there could be other areas cut out for the eyes. In another embodiment, the location of the mouth box could be determined from relationships of facial features and the relationships transmitted to the receiver model from the transmitter model. The model generates the facial feature inside the box that then can be morphed into the received video of the head. Morphing could also be used to compensate for slight changes in lighting or if the model was developed for slightly different conditions. FIG. 4 shows a diagram of the head with the location of the mouth box.

While the present invention has been described by the foregoing detailed description, it will be understood by those skilled in the art that various changes, substitutions and alterations may be made to elements of the video communication system of the various disclosed embodiments without departing from the spirit and scope of the invention. For example, currently proposed communication networks transmit packets of data. Applying the teachings of the present application it is possible for the packet size to be reduced when the facial model is accurate and for the packet size to be increased when the facial model is inaccurate (i.e. an entire frame of video data is transmitted). Such an embodiment would provide a system with a fixed bandwidth and reduced group delay.

In another proposed alternative embodiment a library of facial features for each user could be developed over a period of system use. This library could be utilised by the system to generate the facial feature model utilising a weighting function applied to each facial feature. As has been previously described herein the proposed system is capable of predicting subsequent frames of the facial model for display based upon preceding frames of the facial model. Use of the library could reduce the number of selections necessary by applying such a weighting function (e.g. 40% weighting for −1T for feature from −1T facial model+60% weighting for a currently displayed feature from OT facial model=feature for +1T facial model). In such a system an incorrect prediction of features in the next facial model would have a high probability of being almost correct and even if the +1T facial model is incorrect the +2T or subsequent facial models would correct the error.

Although certain preferred embodiments of the present invention have been described in detail with reference to the figures illustrated in the accompanying drawings, the skilled person will comprehend that the foregoing detailed description is by way of example only and should not be construed in any limiting sense. The skilled person will further appreciate that it has not been possible for the draftsman to describe all of the numerous possible changes in the details of the disclosed preferred embodiments that may result in alternative embodiments of the invention. However, it is contemplated that such changes and additional embodiments remain within the true spirit and scope of the present invention.

What is claimed is:

1. A method of operating a video communication system comprising;

monitoring an event with a video camera to generate a sequence of frames for forming a video image;

selecting video data only from those regions of a current frame of the video image that are different from corresponding regions of a preceding frame of the video image;

comparing one or more of said selected regions of video data to stored video regions of a transmitter facial model;

removing from said selected regions any regions found to compare within a defined limit to regions stored in said facial model;

compressing video data corresponding to said selected regions of the current frame of the video image (less those regions removed in the previous step) and audio data for each of said frames of said video image;

generating a video signal comprising compressed video data and compressed audio data and transmitting said video signal to a receiver;

receiving said transmitted video signal at a receiver;

decompressing said received video signal to produce audio data and a first portion of said video data;

predicting a second portion of the video data for regions of a current frame of a video image that differ from a preceding frame of the video image from said audio data by adding back into the video data data determined by a receiver facial model; and combining said first and second portions of said video data to generate the current frame of a display video image;

wherein said facial model predicts an eigen phase based on a previously uttered sub-phoneme.

2. The method as claimed in claim 1 wherein prediction of an eigen phase based on a previously uttered sub-phoneme is done at both the transmitter and receiver facial models.

3. The method as claimed in claim 1 wherein prediction of an eigen phase based on a previously uttered sub-phoneme is done with a neural network.

4. A video communication system comprising;
   a video camera for monitoring an event and for generating a sequence of frames for forming a video image;
   means for selecting video data only from those regions of a current frame of the video image that are different from corresponding regions of a preceding frame of the video image;
   a data compression module for compressing video data corresponding to said selected regions of the current frame of the video image and audio data for each of said frames of said video image;
   means for generating a video signal comprising said compressed video data and compressed audio data and transmitting said video signal to a receiver;
   a data decompression module for decompressing a received video signal to produce audio data and a first portion of said video data;
   means for predicting a second portion of the video data for regions of a subsequent frame of the video image that differ from a preceding frame of the video image from said audio data based on a sub-phoneme; and
   means for combining said first and second portions of said video data to generate a display image.

* * * * *